(12) United States Patent
Kesig et al.

(10) Patent No.: US 10,149,482 B2
(45) Date of Patent: Dec. 11, 2018

(54) SEAL ARRANGEMENT FOR HORIZONTAL MIXER BOWL

(71) Applicant: ILLINOIS TOOL WORKS INC., Glenview, IL (US)

(72) Inventors: Ricky D. Kesig, Troy, OH (US); John A. Cremeens, Troy, OH (US); Aaron E. Pollock, Houston, OH (US); Jason D. Switzer, Sidney, OH (US); Randy L. Jacoby, Sidney, OH (US); Joel J. Everhart, Tipp City, OH (US); Kyle R. Pulfer, West Liberty, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 115 days.

(21) Appl. No.: 15/453,053

(22) Filed: Mar. 8, 2017

(65) Prior Publication Data

US 2018/0255788 A1 Sep. 13, 2018

(51) Int. Cl.
| | | |
|---|---|---|
| *A21C 1/06* | (2006.01) | |
| *A21C 1/14* | (2006.01) | |
| *B01F 9/00* | (2006.01) | |
| *B01F 9/02* | (2006.01) | |
| *B01F 15/00* | (2006.01) | |

(52) U.S. Cl.
CPC .............. *A21C 1/1485* (2013.01); *A21C 1/06* (2013.01); *A21C 1/1445* (2013.01); *B01F 9/0034* (2013.01); *B01F 9/02* (2013.01); *B01F 15/00058* (2013.01); *B01F 15/00779* (2013.01); *B01F 2015/00084* (2013.01); *B01F 2215/0011* (2013.01)

(58) Field of Classification Search
CPC ....... A21C 1/1485; A21C 1/1445; A21C 1/06; B01F 15/00058; B01F 9/0034; B01F 9/02; B01F 15/00779; B01F 2015/00084; B01F 2215/0011
See application file for complete search history.

(56) References Cited

U.S. PATENT DOCUMENTS

| | | | | |
|---|---|---|---|---|
| 1,510,165 | A | * | 9/1924 | Temple ............... A21C 1/06 366/99 |
| 1,678,193 | A | * | 7/1928 | Notz .................. A21C 1/06 366/99 |
| 1,705,127 | A | * | 3/1929 | Mason ................ A21C 1/06 366/309 |
| 1,767,481 | A | * | 6/1930 | Royan ................ A21C 1/06 220/213 |
| 1,811,472 | A | | 6/1931 | Lauterbur |
| 2,011,494 | A | * | 8/1935 | Lauterbur ........... A21C 1/1485 366/185 |
| 2,155,454 | A | * | 4/1939 | Temple ............... A21C 1/06 220/213 |
| 2,265,552 | A | | 12/1941 | Sticelber |

(Continued)

FOREIGN PATENT DOCUMENTS

EP 1527688 5/2005

OTHER PUBLICATIONS

PCT, International Search Report and Written Opinion, International Application No. PCT/US2016/023670; dated Jul. 5, 2016, 20 pages.

(Continued)

*Primary Examiner* — Tony G Soohoo
(74) *Attorney, Agent, or Firm* — Thompson Hine LLP

(57) ABSTRACT

A horizontal mixer includes a mixer bowl seal arrangement with a removable seal member.

20 Claims, 22 Drawing Sheets

(56) References Cited

U.S. PATENT DOCUMENTS

| | | | | |
|---|---|---|---|---|
| 2,274,220 | A | | 2/1942 | Sticelber |
| 2,415,711 | A | | 2/1947 | Sticelber |
| 3,503,344 | A | | 3/1970 | Sternberg |
| 4,275,568 | A | | 6/1981 | Zielsdorf |
| 4,728,198 | A | * | 3/1988 | Maekawa .............. B01F 7/046 366/279 |
| 5,056,800 | A | * | 10/1991 | Becker .................. F16J 15/406 277/429 |
| 5,090,711 | A | * | 2/1992 | Becker .................. F16J 15/406 277/429 |
| 5,735,603 | A | * | 4/1998 | Kesig ....................... B01F 7/02 366/331 |
| 6,047,558 | A | | 4/2000 | Hall |
| 6,076,754 | A | * | 6/2000 | Kesig ................... B01F 13/105 241/101.2 |
| 8,079,749 | B2 | | 12/2011 | Kitta |
| 2002/0126571 | A1 | * | 9/2002 | Kesig ....................... B01F 7/02 366/331 |
| 2003/0056523 | A1 | * | 3/2003 | Kesig .................. B29B 13/045 62/63 |
| 2009/0245016 | A1 | * | 10/2009 | Oki ......................... A21C 1/06 366/182.4 |
| 2009/0263551 | A1 | * | 10/2009 | Van Praag ............ A21C 1/065 426/519 |
| 2010/0091608 | A1 | * | 4/2010 | Oki ......................... A21C 1/06 366/182.3 |
| 2016/0286823 | A1 | * | 10/2016 | Kesig .................. A21C 1/1445 |

OTHER PUBLICATIONS

Admitted Prior Art, 5 pages. Statement filed on Mar. 8, 2017.

* cited by examiner

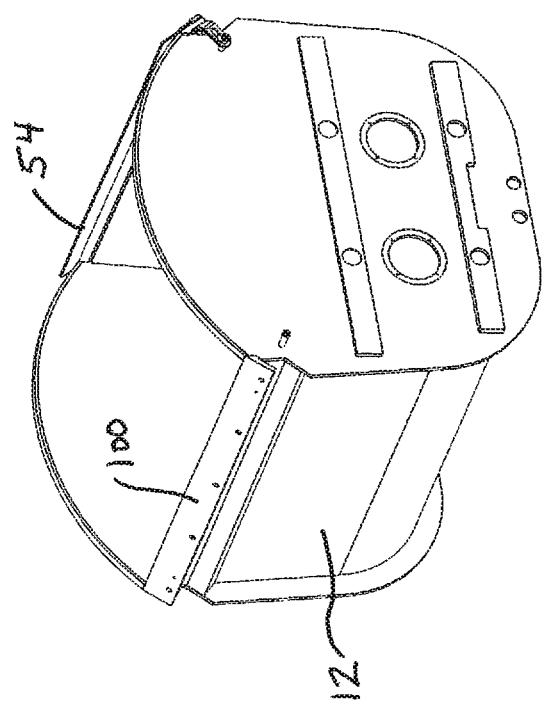
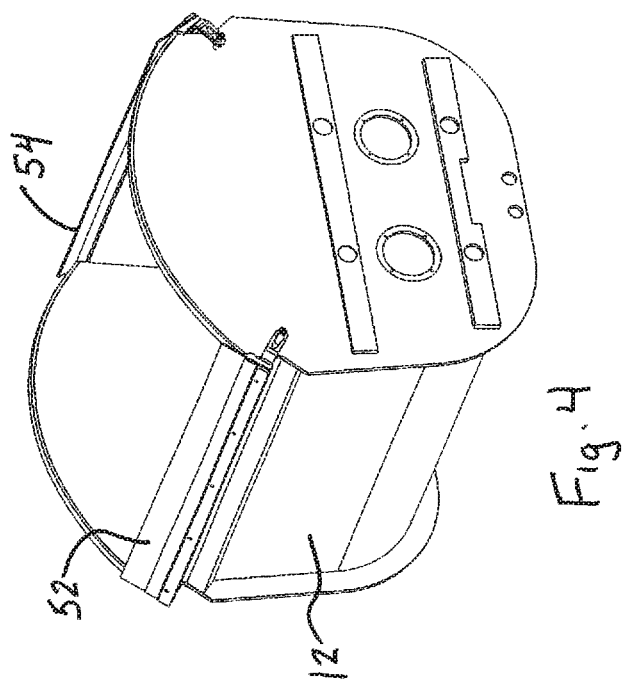

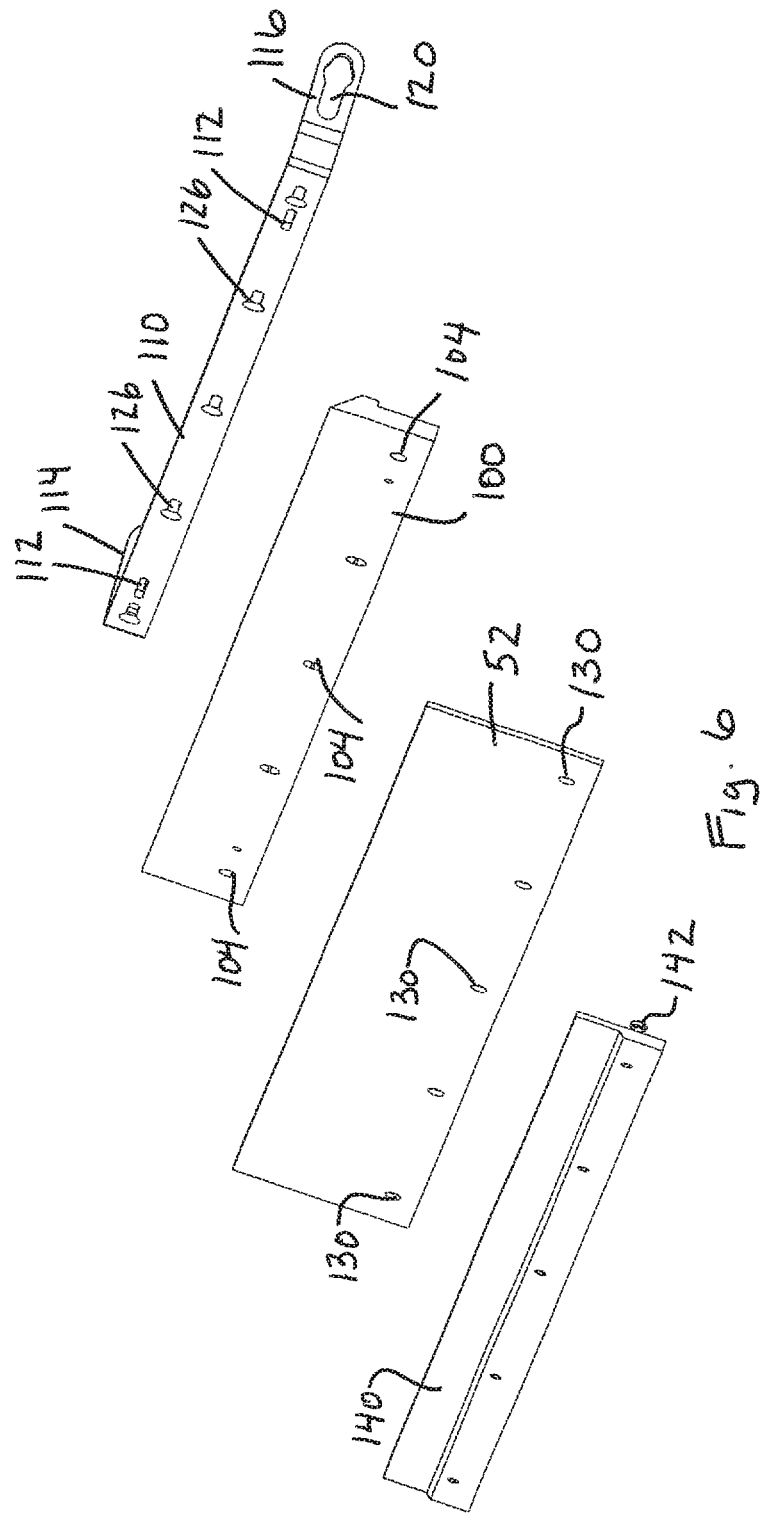

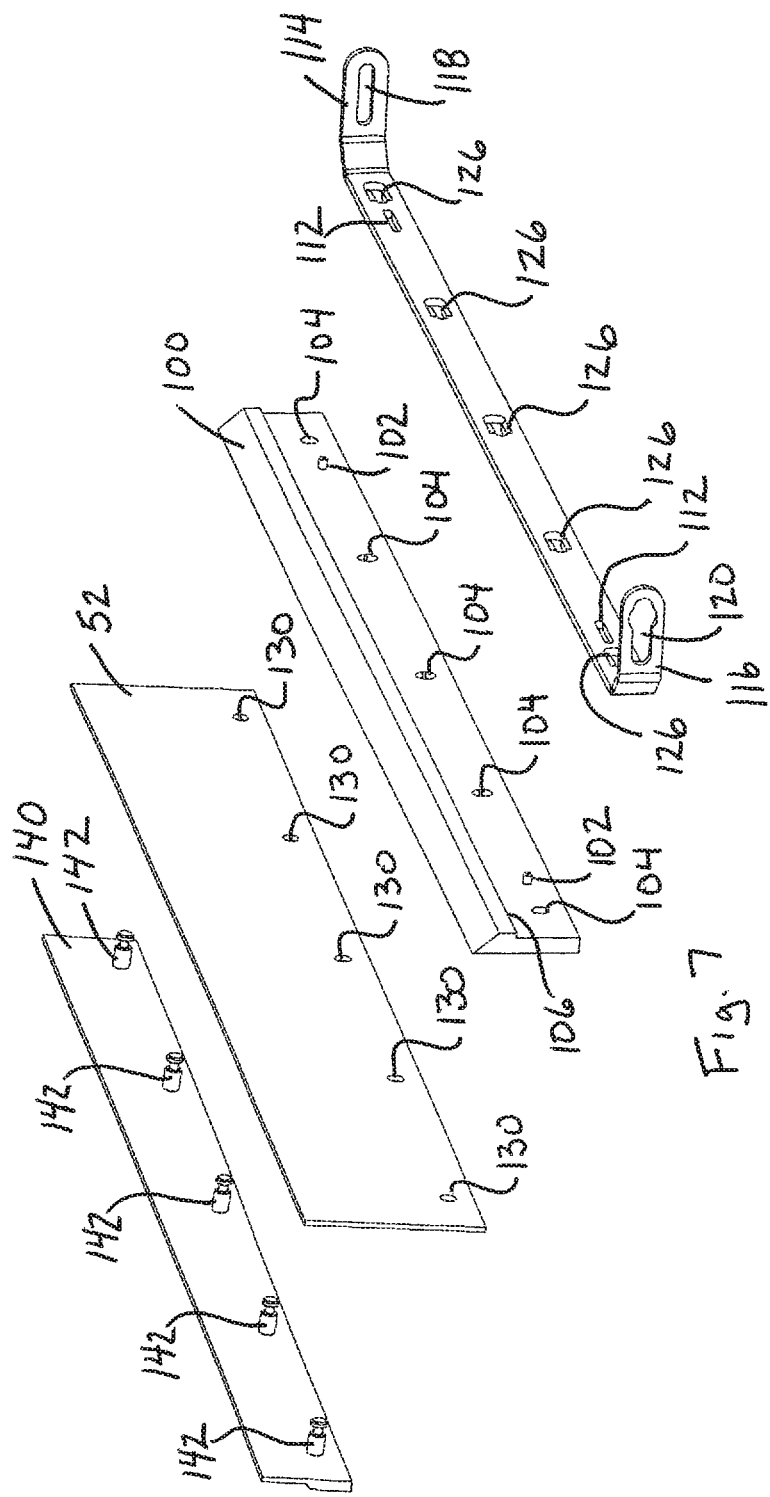

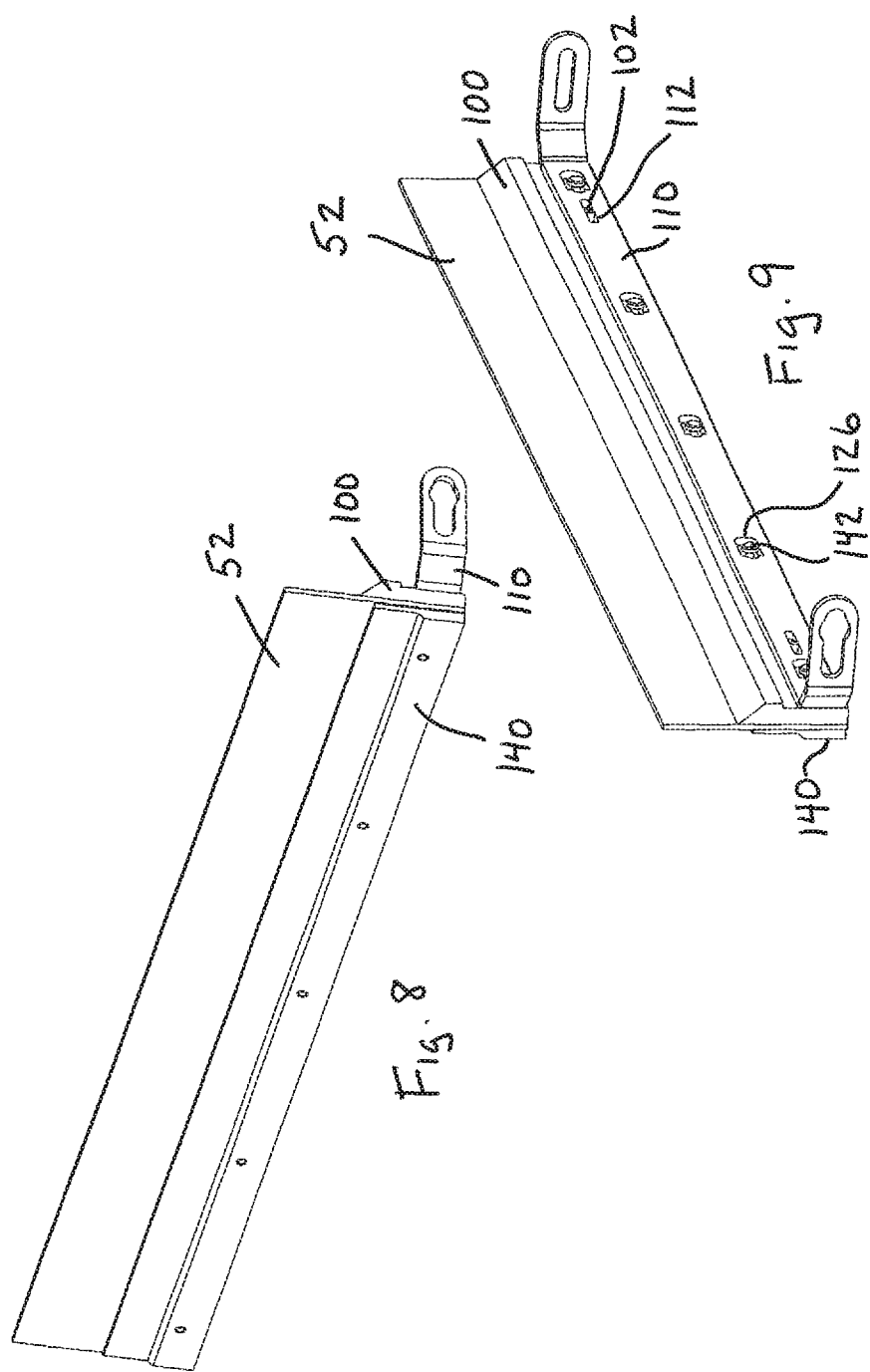

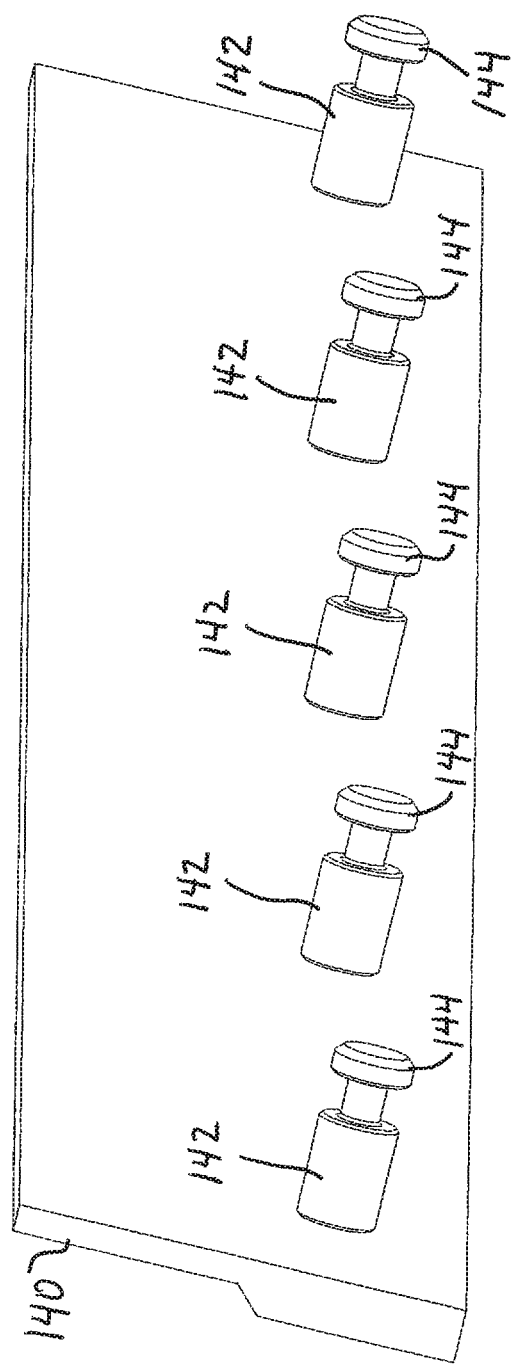

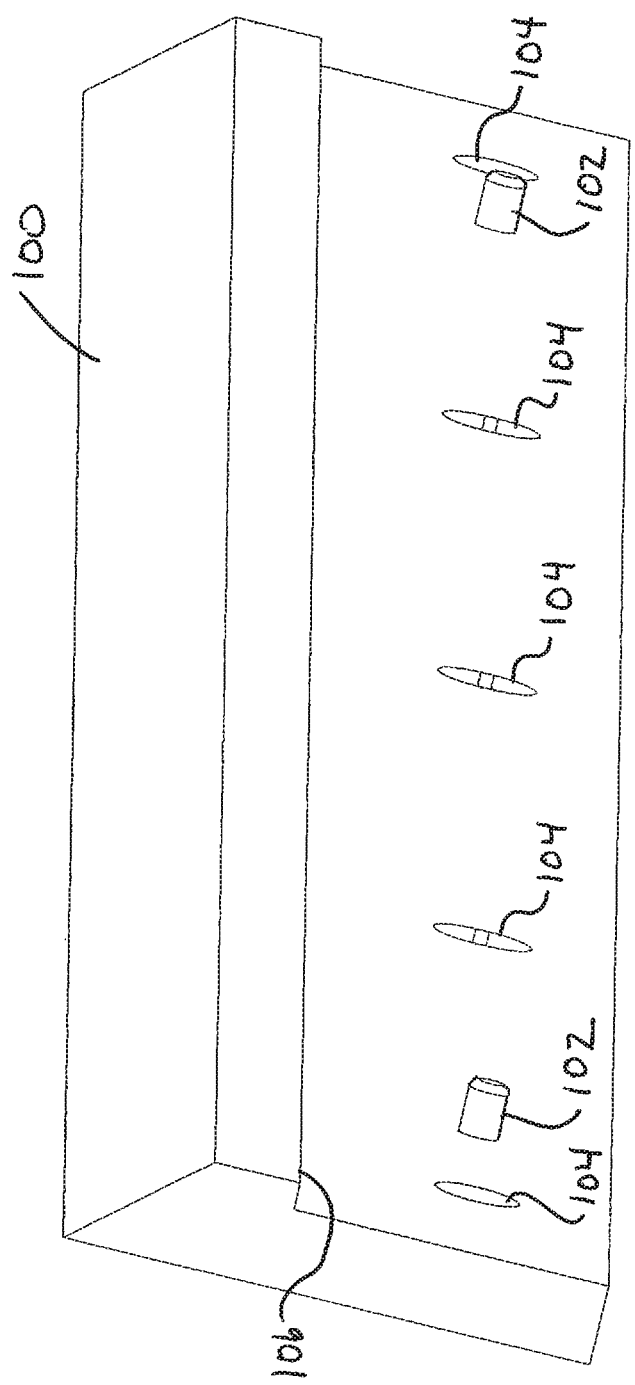

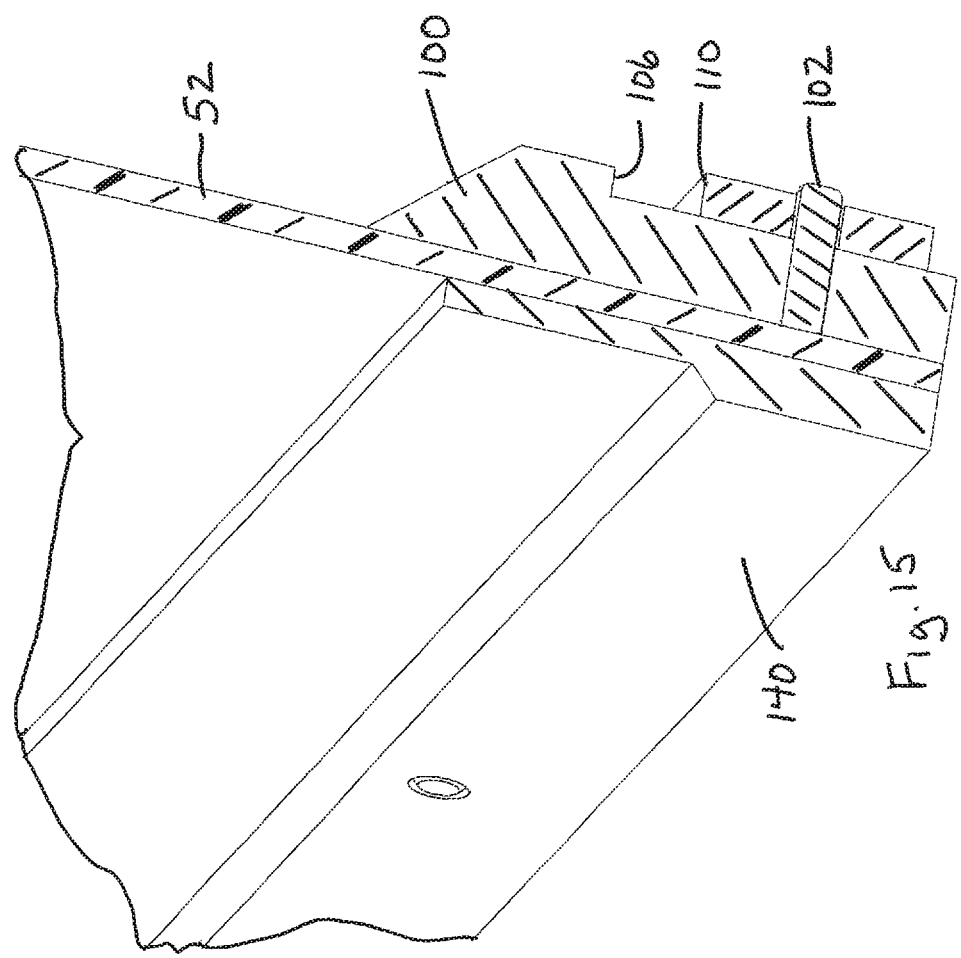

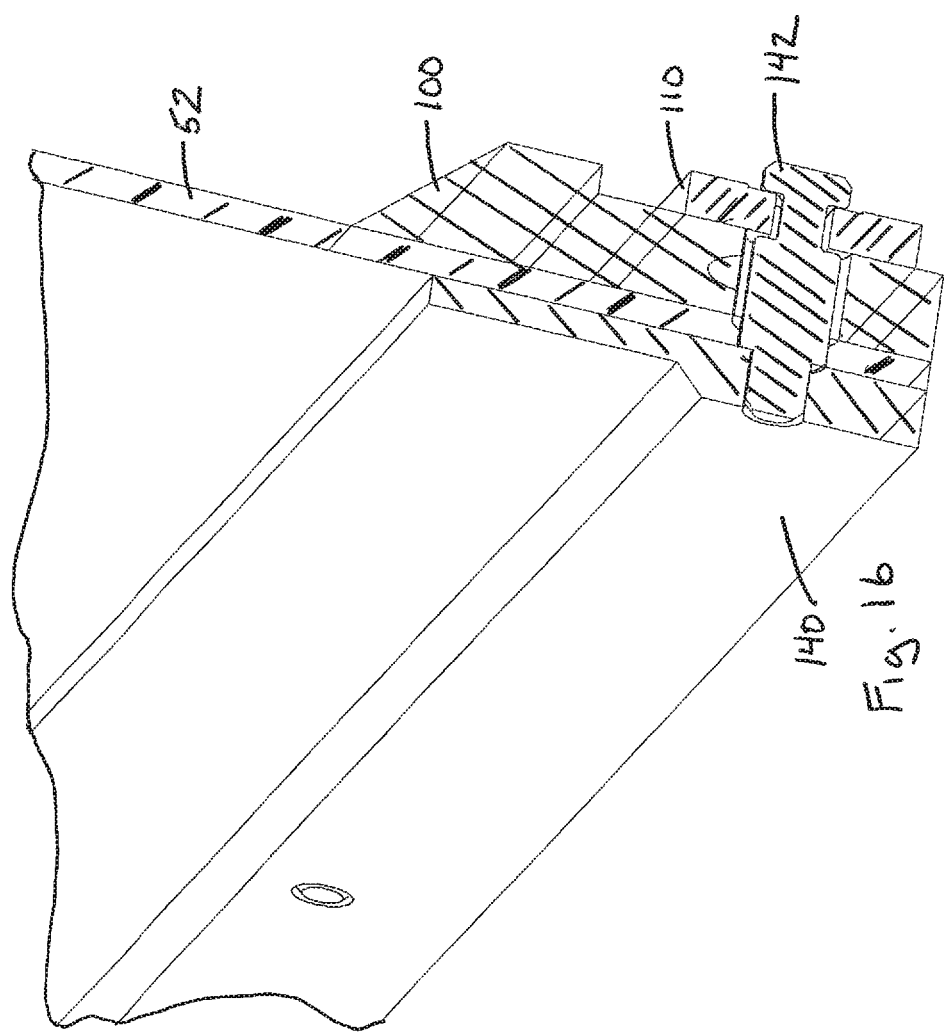

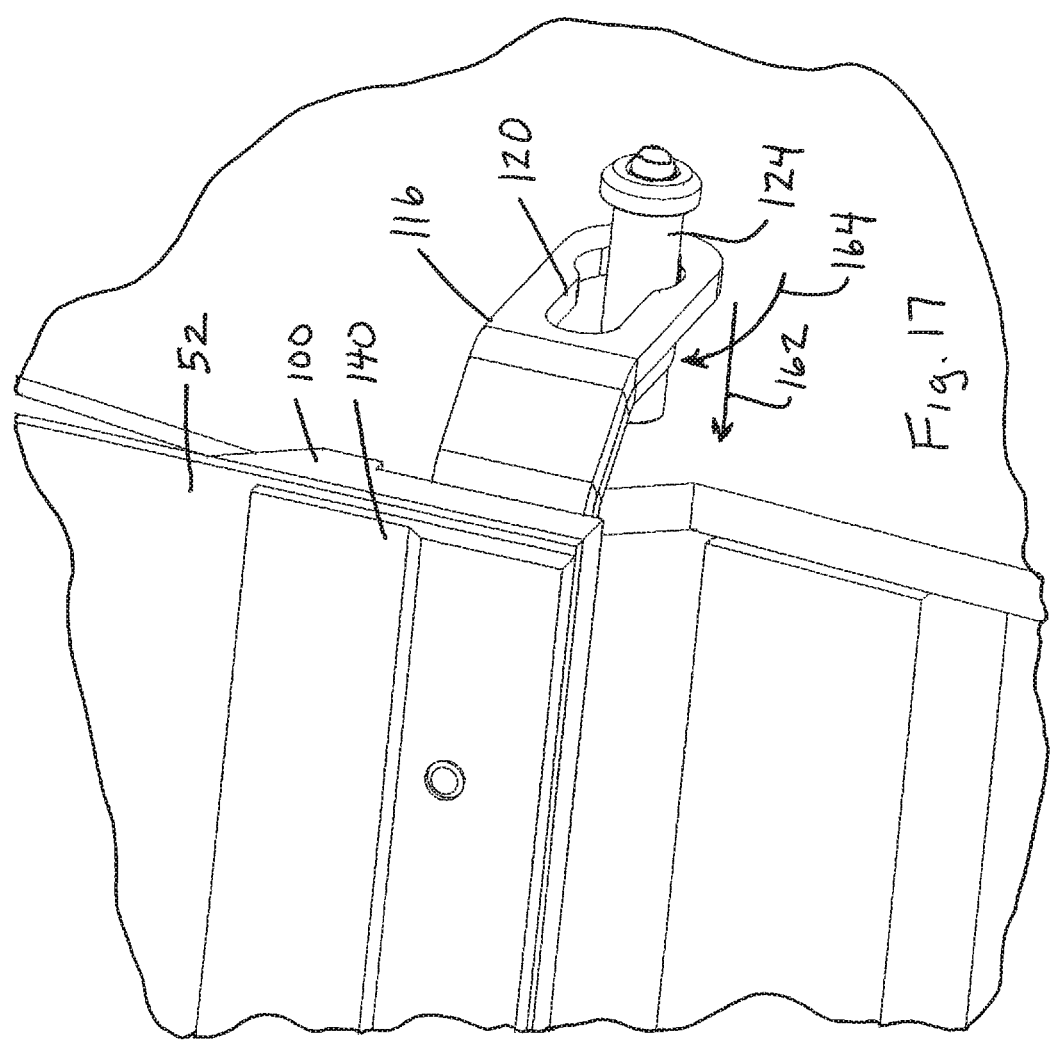

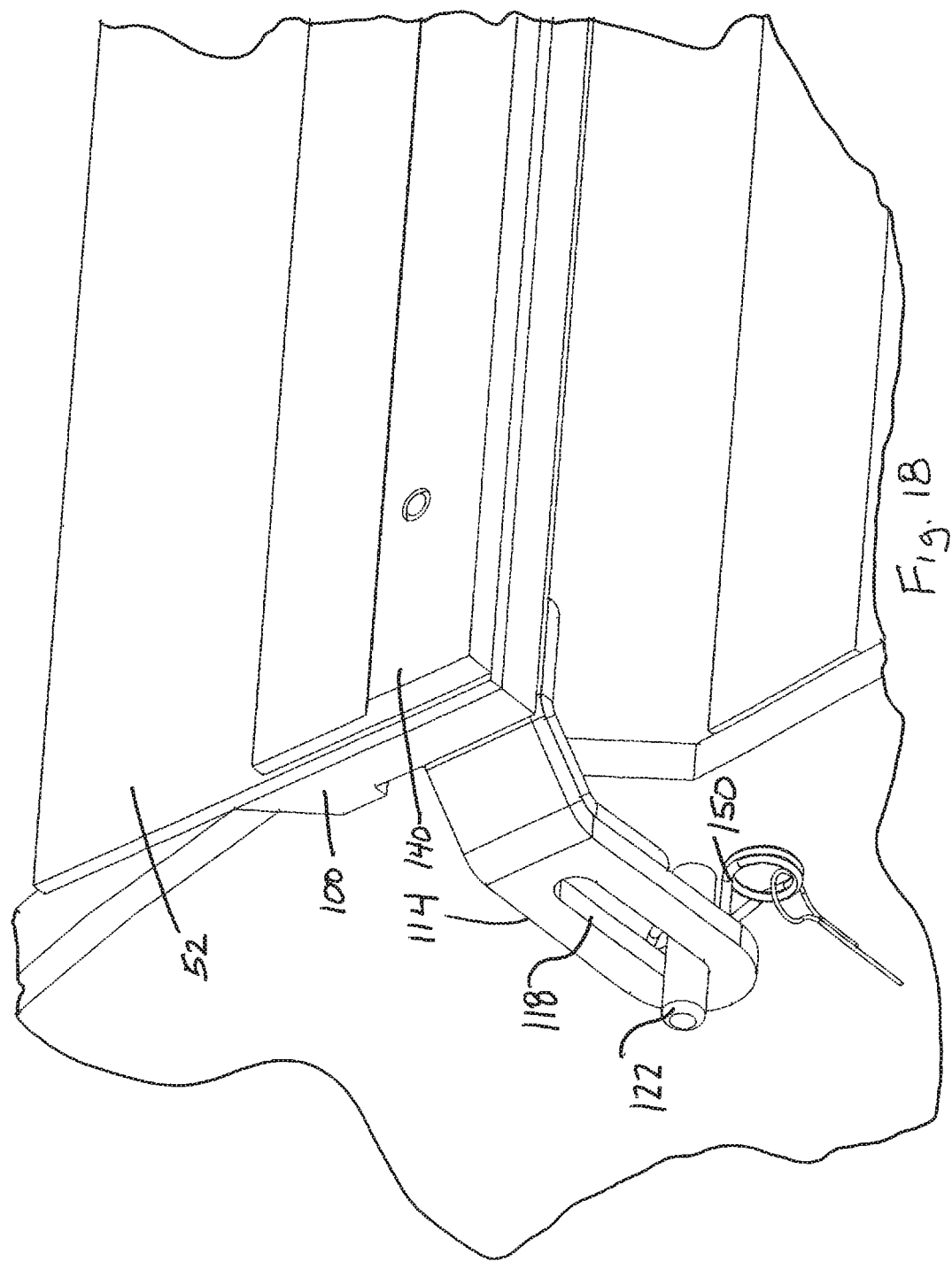

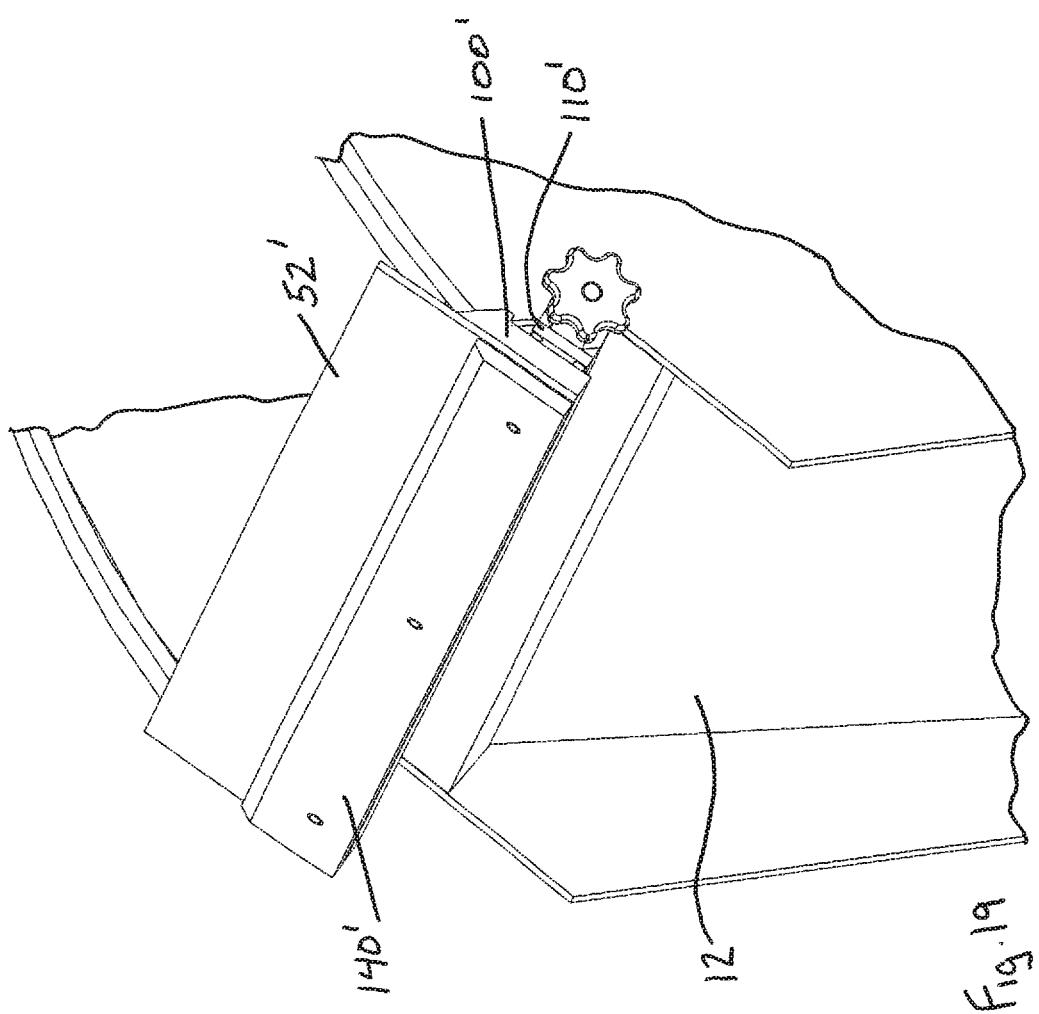

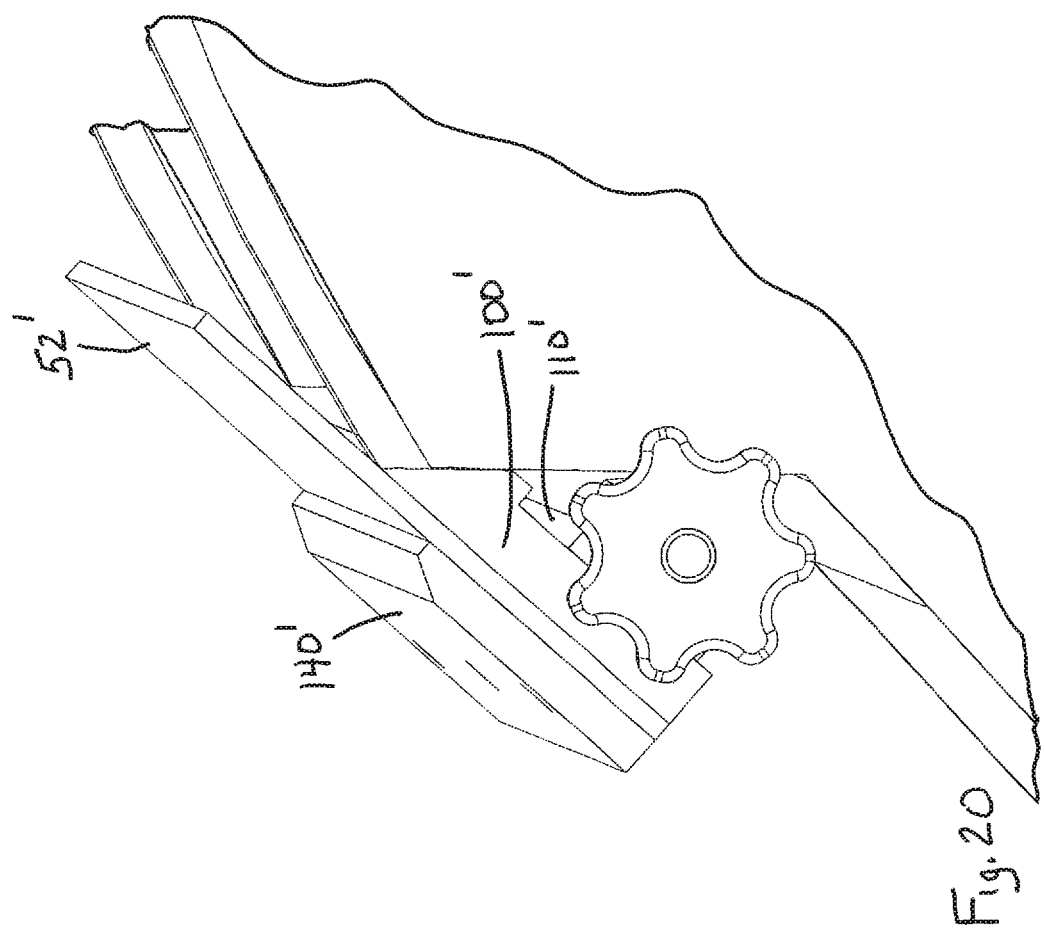

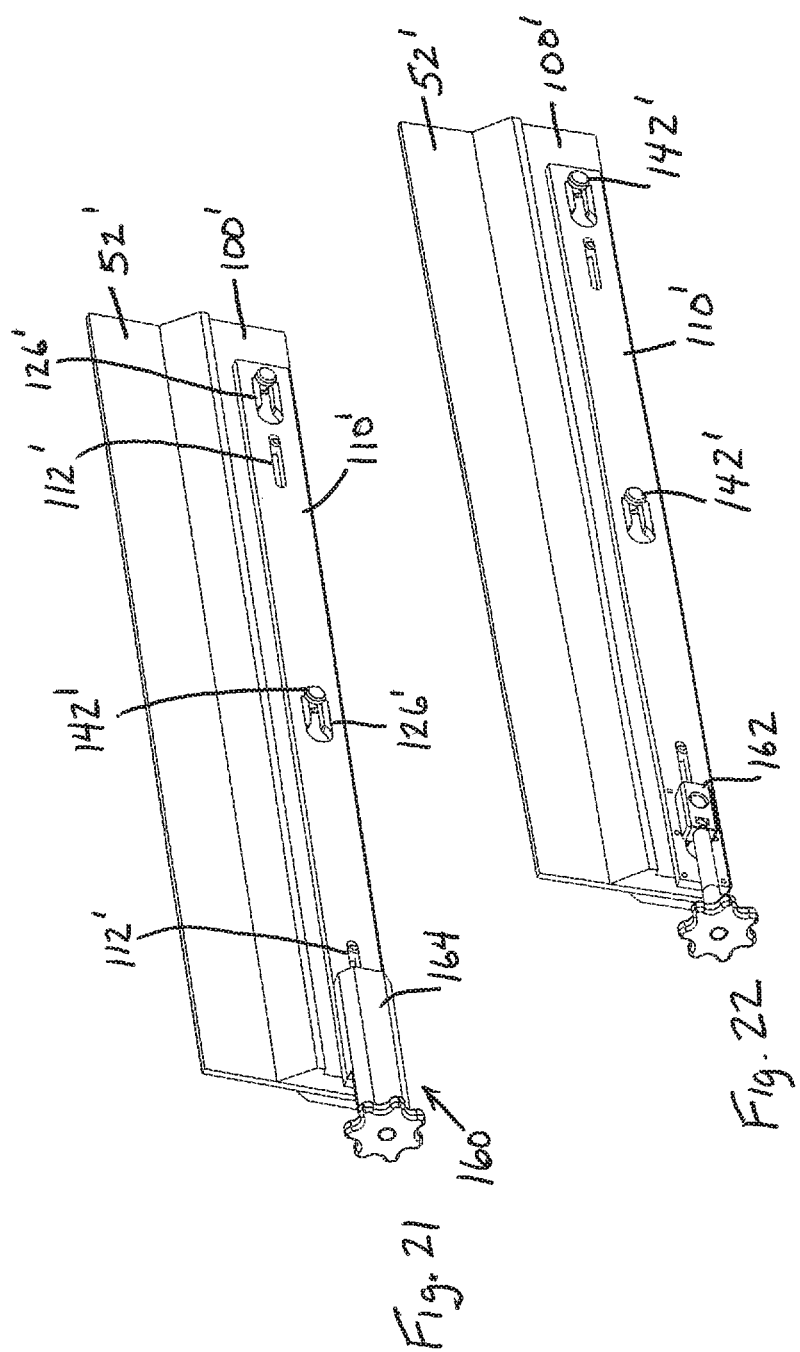

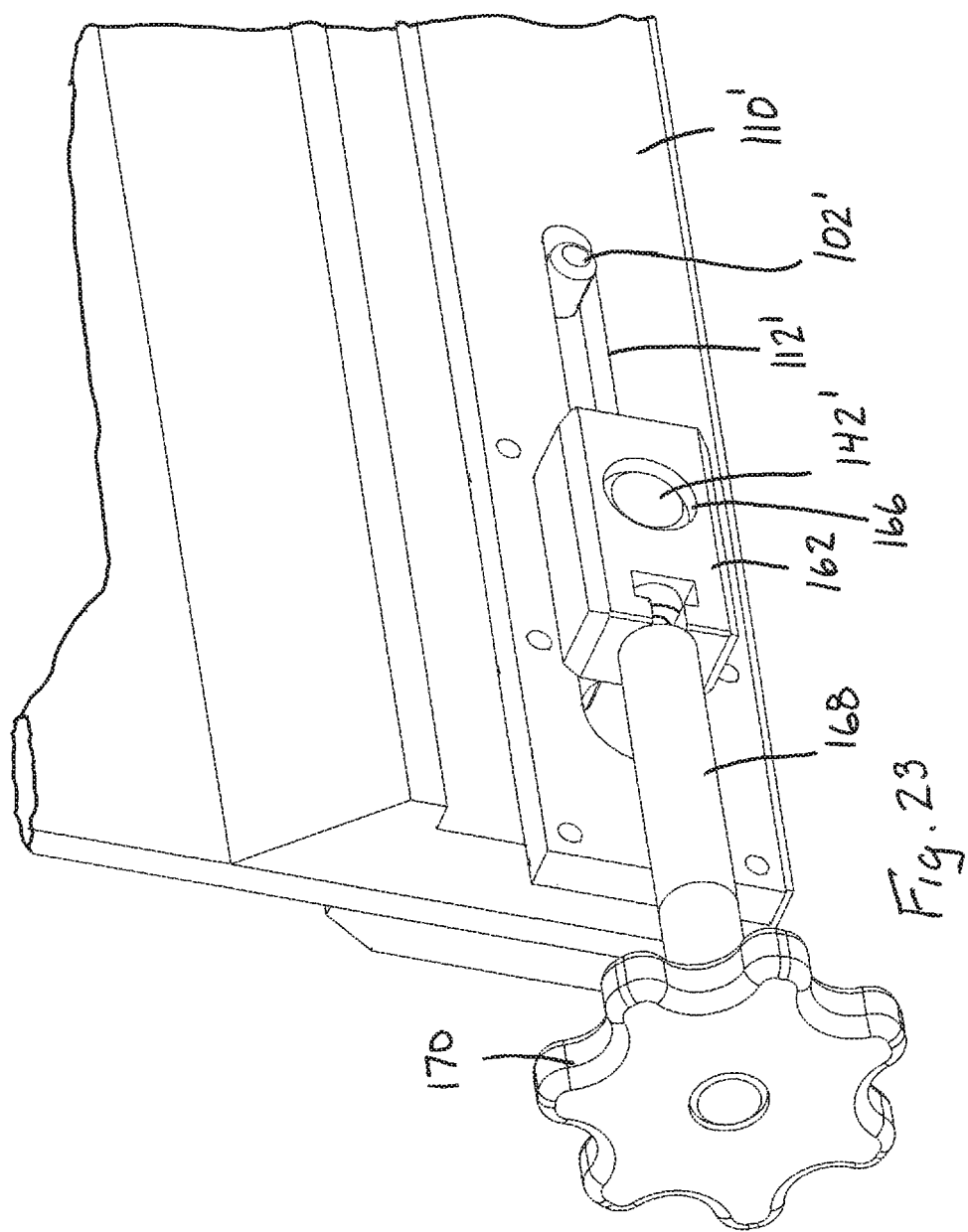

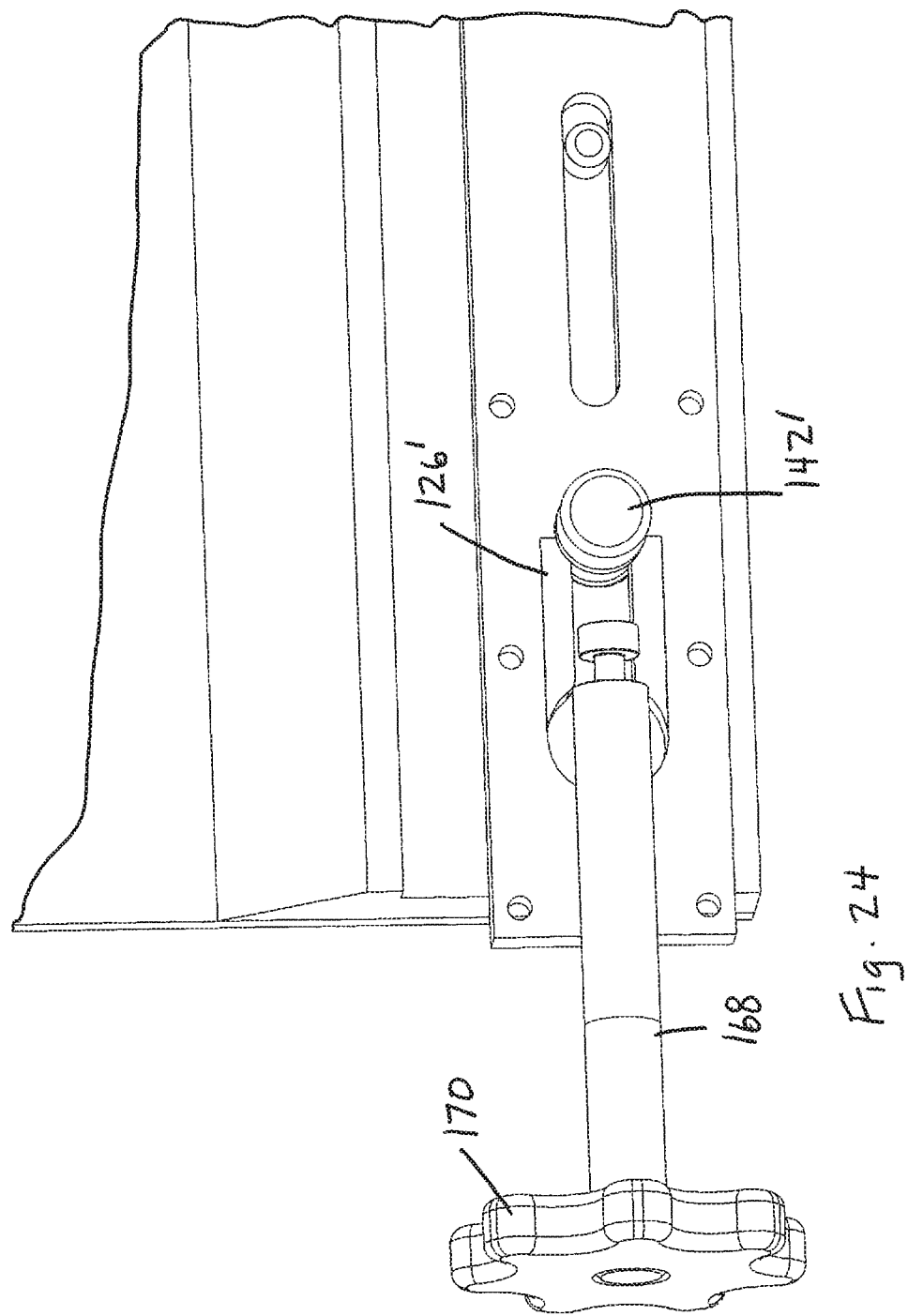

US 10,149,482 B2

SEAL ARRANGEMENT FOR HORIZONTAL MIXER BOWL

TECHNICAL FIELD

This application relates generally to horizontal mixers, such as dough mixers, and, more specifically, to a seal arrangement for such mixers.

BACKGROUND

The mixer bowls of horizontal mixers tend to be quite large and therefore commonly have a bowl tilt feature so that mixed product such as dough can be emptied from the bowl (e.g., into a dough trough alongside the bowl). During tilt the bowl pivots on a horizontal axis relative to an overhead canopy that covers the open top of the bowl during mixing. Standard canopy sealing for single tilt (i.e., to only one side of the canopy) mixer bowls is with a straight compression seal across the front of the canopy (where the front is the tilt side) and a scraper on the rear of the canopy to scrape the downward facing surface of the canopy during the tilt. For two-way tilting (i.e., to either side of the canopy), seal bars that pneumatically are positioned and compressed against line of contact between the bowl and canopy have been used. However, the pneumatic sealing arrangement is complex and can create maintenance issues.

It would be desirable to provide a simpler, but effective system seal assembly for mixer bowls in horizontal mixers.

SUMMARY

In one aspect, a horizontal mixer includes a mixer bowl mounted for rotation about a horizontal axis between an upright mix position and a turned load/unload position. A canopy is located to cover an open top of the bowl when the bowl is in the upright mix position. A scraper seal member is located at a top side portion of the bowl and engages with an underside of the canopy when the bowl is in the upright mix position. The scraper seal member is part of a seal assembly that includes a mounting plate fixed to the bowl, a removable clamp plate at one side of the mounting plate and a removable clamp bar at an opposite side of the mounting plate, with a portion of the scraper seal member held between the clamp plate and the mounting plate.

In another aspect, a horizontal mixer includes mixer bowl mounted for rotation about a horizontal axis between an upright mix position and a turned load/unload position. A seal member is located at a top side portion of the bowl and is removably held in place by a seal assembly that includes a plurality of clamp pins that interact with a laterally movable clamp bar to squeeze a portion of the seal member between first and second plate members.

In a further aspect, a horizontal mixer includes a mixer bowl mounted for rotation about a horizontal axis between an upright mix position and a turned load/unload position. A seal member is located at a top side portion of the bowl and is held in place by a seal assembly that includes a plurality of clamp pins that interact with a laterally movable clamp bar to squeeze a portion of the seal member between first and second plate members.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 4 shows an isolated view of a mixer bowl with two side seals;
FIG. 5 shows the mixer bowl with one side seal removed;
FIGS. 6 and 7 show exploded views of one embodiment of bowl seal assembly (bowl not shown);
FIGS. 8 and 9 show assembled views of the seal assembly (bowl not shown);
FIG. 10 shows a perspective view of the clamp plate of the seal assembly;
FIG. 11 shows a perspective view of the mounting plate of the seal assembly;
FIG. 15 shows a cross-section view of the seal assembly through a dowel pin;
FIG. 16 shows a cross-section view of the seal assembly through a clamp pin;
FIGS. 17 and 18 show a partial perspective views of clamp bar mounting to the bowl;
FIGS. 19 and 20 show partial perspectives of a mixer bowl with another embodiment of a seal assembly;
FIG. 21 shows a perspective of the seal assembly (bowl not shown);
FIG. 22 shows a perspective of the seal assembly (bowl and position adjustment housing not shown);
FIG. 23 shows an enlarged partial perspective of the positioning assembly (housing not shown);
FIG. 24 shows an enlarged partial perspective of the positioning assembly (housing and adjustment block not shown)

DETAILED DESCRIPTION

Figure 1:
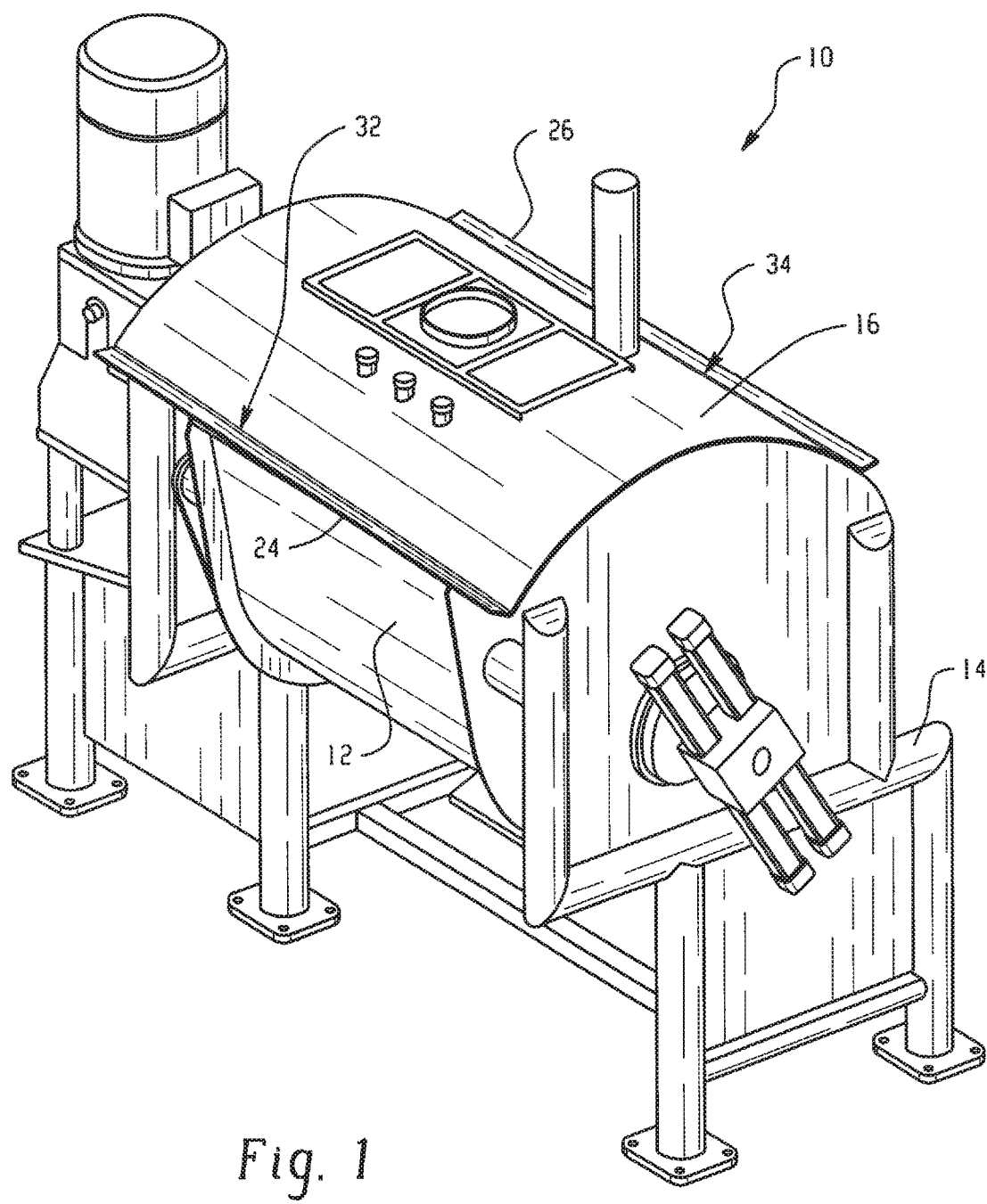
FIG. 1 shows a perspective view of a horizontal mixer.
Figure 2:
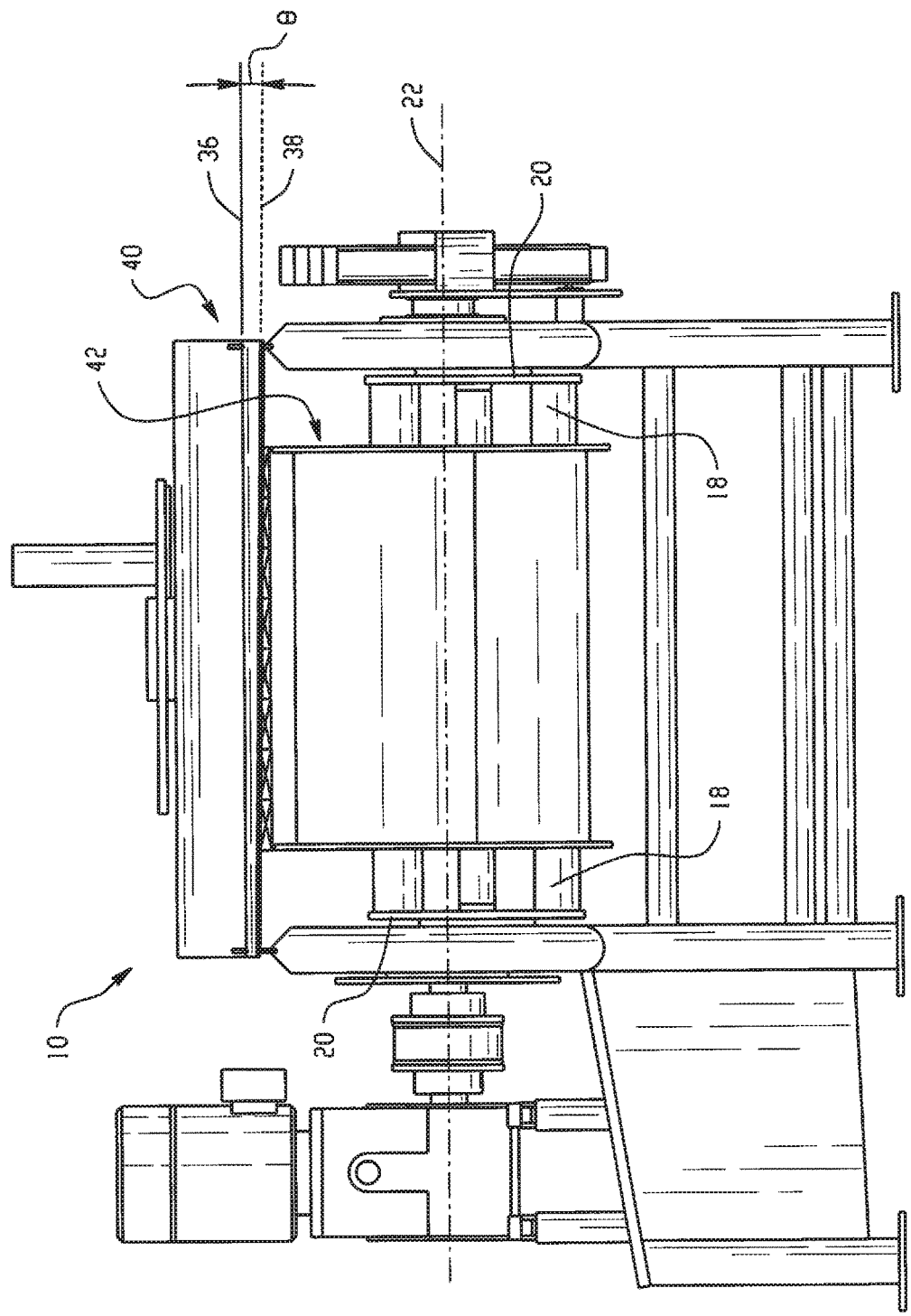
FIG. 2 shows a side elevation view of the mixer of FIG. 1.
Figure 3:
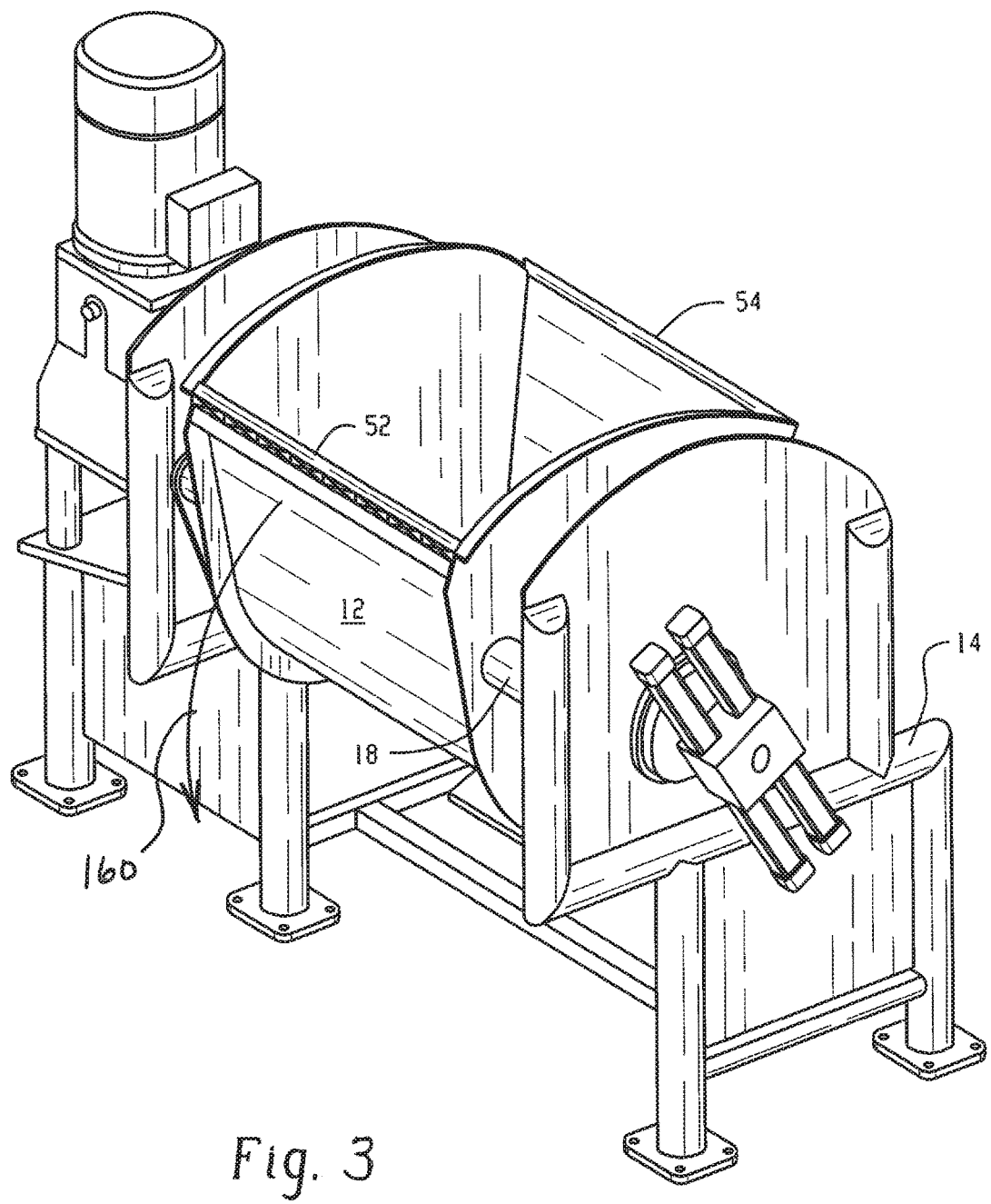
FIG. 3 shows a partial perspective view of the mixer of FIG. 1 with canopy not shown.
Figure 12:
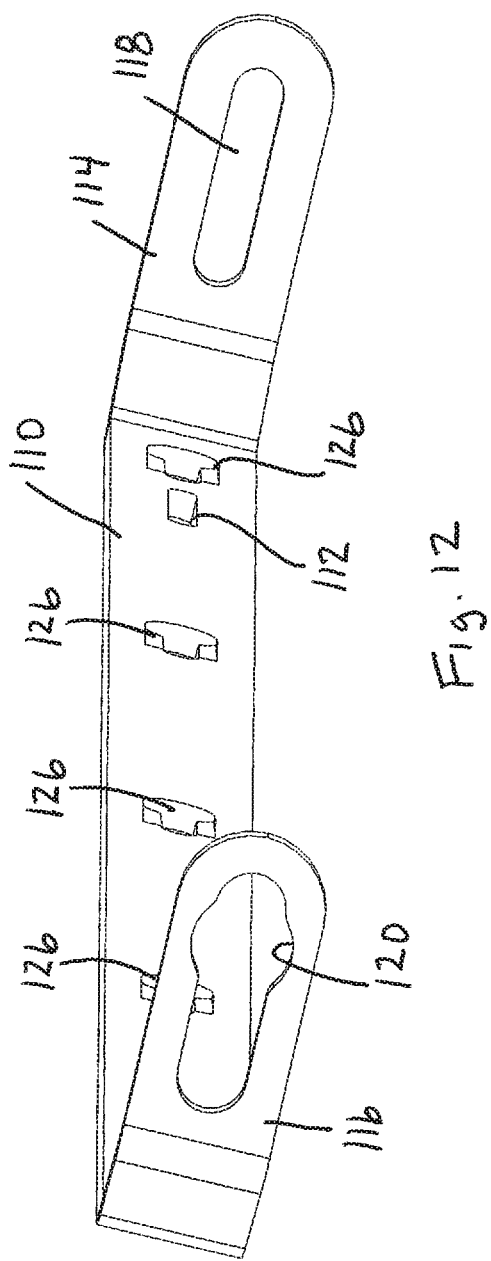
FIG. 12 shows a perspective view of the clamp bar of the seal assembly.
Figure 13:
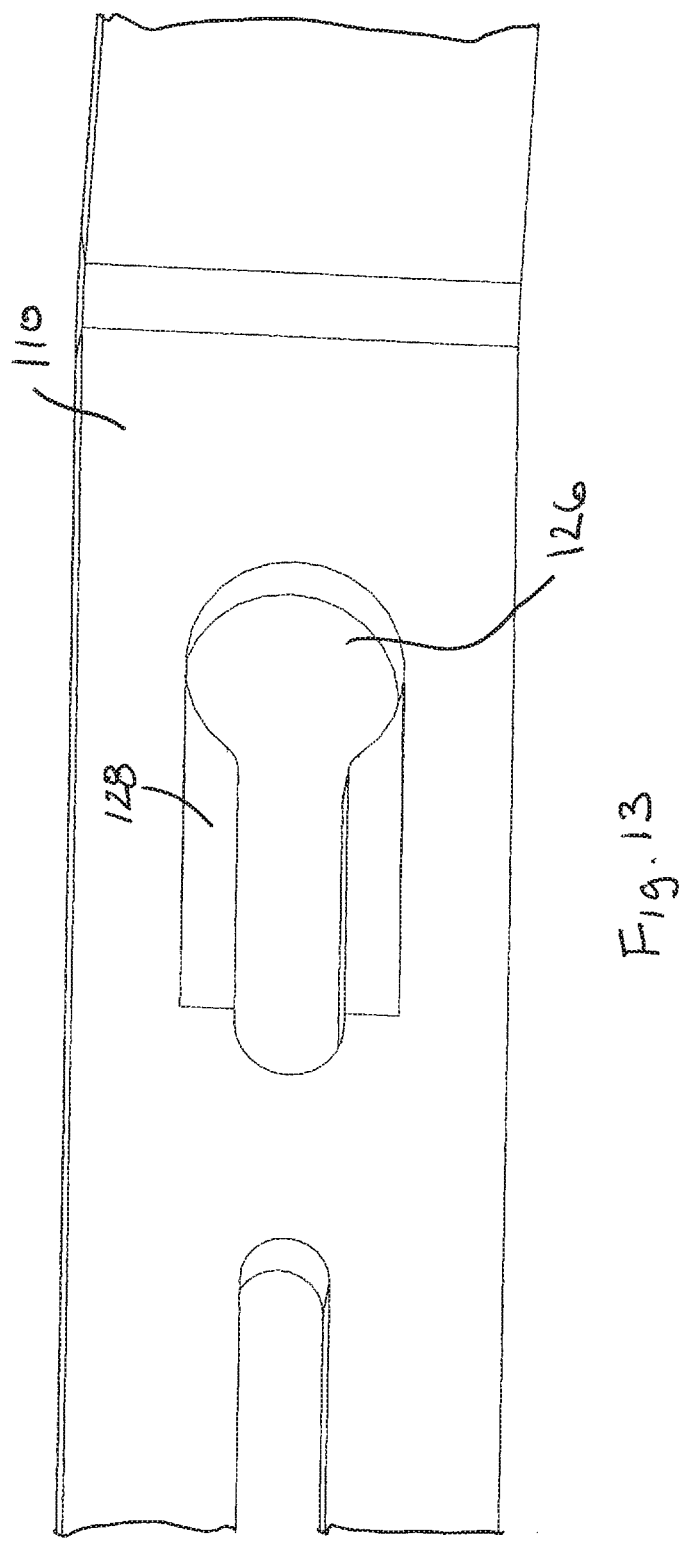
FIGS. 13 and 14 show enlarged partial views of the clamp bar.
Figure 14:
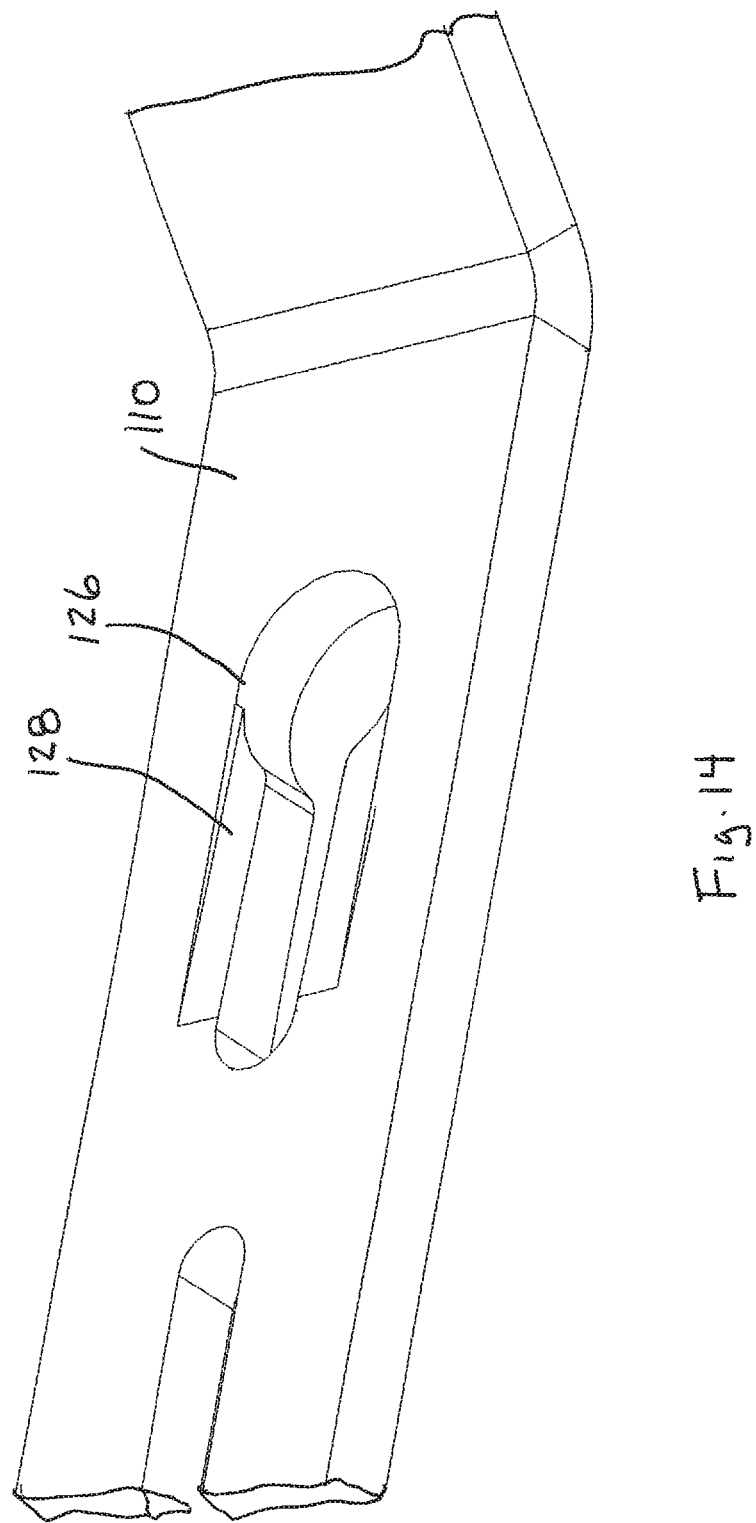
Figure 25:
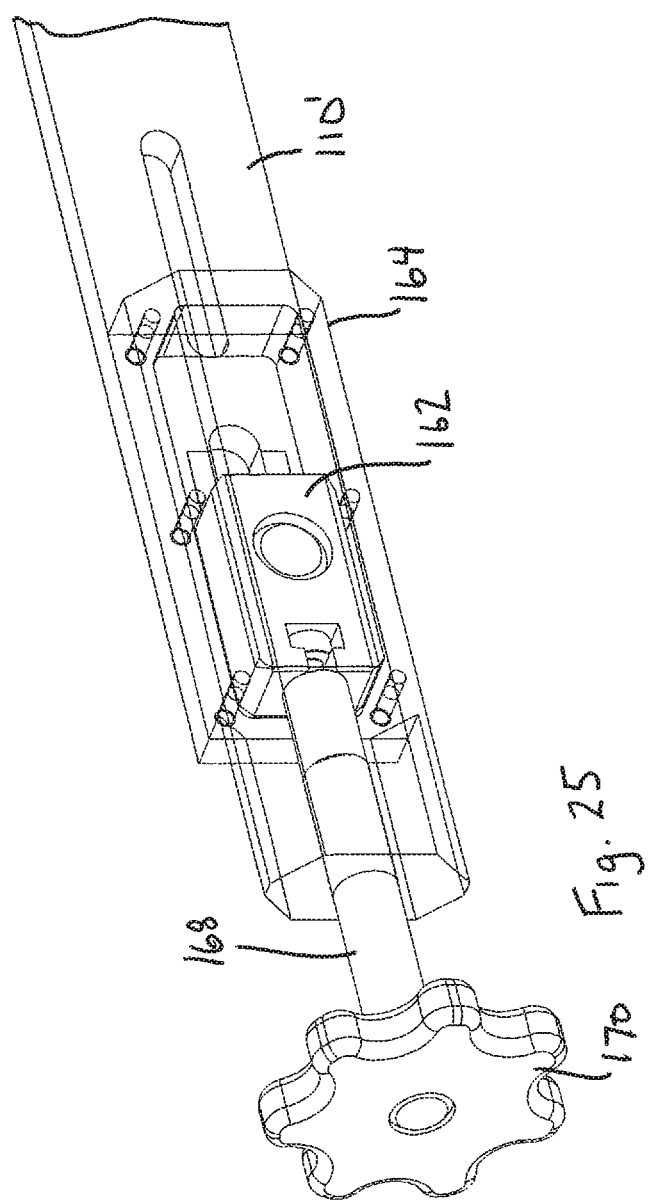
FIG. 25 shows an enlarged partial perspective of an end of the clamp bar with positioning assembly, where the housing is depicted as transparent.

Referring to FIGS. 1-3, a horizontal mixer 10 includes a mixing bowl 12 supported on a frame 14 and mounted for relative rotation on the frame 14. The mixing bowl 12 is an open top arrangement. A canopy 16 is located to cover the open top of the bowl when the bowl is in an upright position used for mixing. The mixing bowl 12 is supported at each end by support members 18 that are mounted to respective support plates 20. An agitator (not shown here, but show in U.S. Pat. No. 8,079,749, which is incorporated herein by reference) is rotatably mounted within the mixing bowl 12. The mixing bowl 12 can be tilted about a horizontal axis 22 for movement between an upright mix position and a turned load/unload position (e.g., per FIG. 2 of U.S. Pat. No. 8,079,729) for loading and unloading of material.

The canopy 16 includes side edges 24 and 26, which may be defined by the free ends of upwardly extending lips or flanges that are formed on the canopy. The lips/flaps form gutters 32 and 34 at the sides of the canopy 16. The gutters may be slightly offset at a non-zero angle relative to horizontal in the direction from end to end of the bowl (as suggested by angle θ in FIG. 2, where line 36 represents horizontal and dashed line 38 represents an extension of the orientation of the gutters) so that any potential contaminant material entering the gutters flows to one lateral end 40 of the mixer well beyond lateral end 42 of the bowl 12. The canopy edges 24 and 26 are similarly angled downward. In the illustrated embodiment the angle of the gutters directs material away from the drive end of the mixer, which is also the operator end of the mixer.

As described in detail in U.S. Patent Publication No. 20160286823, which is incorporated herein by reference, the side edges 24 and 26 of the gutter lips/flanges 32 and 34 may also angle slightly outward in the direction from end to end of the bowl relative to the horizontal pivot axis 22 of the bowl and away from the bowl (as suggested by angles α1 and α2 in FIG. 4 of U.S. Patent Publication No. 20160286823).

As seen in FIG. 3, the upper portion of each side of the mixer bowl includes a respective upwardly and inwardly extending scraper type seal 52 and 54. The seals may be oriented generally horizontally in side elevation view (e.g., the upper edge of each seal extends horizontally, in parallel with the tilt axis 22 of the mixer bowl). The seals may be of slightly flexible polymeric material that allows for some give of the seals when they come into contact with the canopy 16. In this regard, in certain embodiments the downward and outward taper of the underside portions of the gutters causes the seals 52 and 54 to initially come into contact with the lower, outer end of the underside of the gutter when the bowl 12 is being rotated from a turned load/unload position back up to its upright position.

Referring to FIGS. 4-18, the mounting of the seals to the bowl is described. In particular, FIG. 4 shows the bowl 12 in isolation, with both seals 52 and 54 installed, while FIG. 5 shows a similar view with scraper seal 54 installed, but with scraper seal 52 not installed. Each scraper seal member 52, 54 is part of a respective seal assembly that is removably mounted to the bowl. In this regard, as seen in FIG. 5, each side of the bowl includes an integrated mounting plate 100 (e.g., welded to the bowl body). The back side of the mounting plate 100 includes a set of dowel pins 102 protruding therefrom (here two dowel pins 102 are provided, but the number could vary), a plurality of spaced apart through openings 104 and a shoulder 106. The rearward facing surface above the shoulder may provide a contact point with the upper edge of the bowl for welding of the plate 100 to the bowl 12. The dowel pins may, by way of example be but-welded to the mounting plate or welded within recesses or through holes of the mounting plate, but could be connected to the mounting plate by other means as well.

A removable clamp bar 110 is positionable at the back side of the mount plate and includes elongated slots 112 through which the dowel pins 102 can be positioned. As best seen in FIGS. 17 and 18, end portions 114 and 116 of the clamp bar extend around the ends of the bowl 12 when the clamp bar is installed, with end portion 114 including an elongated slot 118 and end portion 116 including a keyed slot 120. When installed, an end post 122 of the bowl extends through slot 118 and an end post 124 extends through keyed slot 120.

The lower portion of the seal member 52 seats against the front side of the mount plate 100 and includes through holes 130 that align with the through holes 104. A scraper clamp plate 140 includes a set of slotted clamp pins 142 that align with and extend through the holes 130 and 104 upon assembly. The clamp pins 142 also extend through keyed slots 126 in the clamp bar 110 in order to hold the entire seal assembly together. In this regard, the narrow portion of each keyed slot 126 of the clamp bar 110 includes a tapered cam surface 128 (FIGS. 13 and 14) that interacts with the head portion 144 of a corresponding clamp pin 142 extending therethrough to pull the clamp plate 140 toward the mounting plate 100 when the clamp bar 110 is shifted laterally relative to the mounting plate 100 and the clamp pins 142 so that the clamp pin head portions 144 move into the narrow portion of the keyed slots 126. This pulling of the of the clamp plate 140 toward the mounting plate 100 thus grips or clamps the lower portion of the seal member tightly between the two plates 140 and 100 to hold the seal member in place for use and operation of the bowl. Once the clamp bar 110 is laterally shifted into the operating and clamping position, a removable cotter pin 150 is inserted through a hole in the end post 122 to prevent the clamp bar 110 from shifting out of the operating and clamping position.

Generally, to install a seal assembly (e.g., for seal member 52) to the bowl, the sequence of steps would be as follows. If the bowl 12 is installed on the frame 14, as typically would be the case when a bowl seal member is being replaced, rotate the bowl downward (e.g., per arrow 160 in FIG. 3) so as to place the side of the bowl in position for access. Install the clamp bar 110 by positioning the end portion 116 on the end post 124 with the end post 124 passing through keyed slot 120, and then slide the clamp bar laterally (in the direction of arrow 162 of FIG. 17) so that the opposite end portion 114 of the clamp bar can be disposed on end post 122 with end post 122 passing through slot 118 (per FIG. 18). Once both end portions 114 and 116 are positioned on respective end posts 122 and 124, pivot the clamp bar 110 toward the mounting plate 100 (e.g., in the direction of arrow 164 of FIG. 17) so that the dowel pins 102 engage into the clamp bar slots 112 to hold the clamp bar 110 in the correct pivot position relative to the mounting plate 100, which position is shown in FIG. 17. The clamp bar 110 is then shifted laterally, whichever lateral direction is appropriate, as needed to align the enlarged key hole portions of the keyed slots 126 with the mounting plate openings 104. The scraper seal member 52 is then assembled onto the clamp plate 140 with slotted pins 142 passing through the scraper seal member holes 130. The slotted pins 142 are then passed through the aligned openings 104 and keyed slots 126 so that the lower portion of the scraper seal member 52 is sandwiched between the clamp plate 140 and the mounting plate 100. The scraper clamp bar 110 is then shifted laterally (e.g., by manually pushing or by hammer tap, in direction 162) so that head portions of the slotted pins 142 move into the narrow portions of the keyed slots 126 and interact with the cam surfaces 128 to achieve a tight clamping of the clamp plate 140 toward the mounting plate 100. The cotter pin 150 is then inserted in end post 122 to maintain the scraper seal assembly in place. To remove a scraper seal member for the purpose of repair or replacement, a reversed sequence of the above steps is carried out.

Other mount arrangements for the clamp bar are possible, including arrangements in which end posts 122 and 124 are not used. By way of example, reference is made to FIGS. 19-25 in which a scraper assembly includes a mounting plate 100', a seal member 52', a clamp plate 140' and a clamp bar 110'. In this case, the clamp plate 140' includes a set of three clamp pins 142' and thus the clamp bar 110' has three keyway openings 126'. The seal member 52' and mounting plate 100' also include three corresponding openings (not shown) through which the pin members 142' pass in order to engage with the keyway openings 126'. Pins 102' projecting from the back side of the mounting plate 100' engage with elongated slots 112' in the clamp bar. The clamp bar 110' includes a positioning assembly 160 mounted thereon for laterally adjusting a position of the clamp bar 110' along the mounting plate 100'. Here, the positioning assembly 160 includes an adjustment block 162 slidable laterally within and along a slot or recess of a housing 164 that is fixed (e.g., welded or fastened) toward one end of the clamp bar 110'. The adjustment block 162 includes an opening 166 that engages with one of the clamp pins 142'. A rod 168 includes a mid-portion threadedly engaged with the housing 164, and internal end portion within the housing and connected to the adjustment block 162 and an external end portion with an associated handle 170 to facilitate rotation of the rod to achieve adjustment. Here, a non-threaded rotating joint interconnects the rod 168 to the adjustment block 162.

When the pin 142' is engaged with the adjustment block, because the pin is stationary, rotation of the rod 168 causes shifting of the lateral position of the housing 164, as well as the clamp bar 110', in order to adjust the relative lateral position between the rod 168 and both the housing and the clamp bar. Because the rod 168 is operatively connected to the adjustment block, rotation of the rod 168 also shifts a relative lateral position between the adjustment block 162, as well as the pin inserted therein, and the clamp bar 110'. Thus, rotation of the handle 170 enables the lateral positions of the pins 142' within the slots 126' to be adjusted by causing the clamp bar 110' to shift laterally along the back of the mounting plate 100'. Rotation of the handle 170 in one direction causes interaction of the pins 142 and slots 126' (which have narrow portions with tapered cam surfaces as described above for slots 126) to tightly clamp the seal member as the pins 142' are moved further along the narrow portion of the keyway slots 126'. Rotation of the handle in the other direction causes the pins 142' to move toward the enlarged key hole portion of the slots 126', reducing or eliminating any clamping force and enabling the clamp bar 110' to be removed once the pins 142' align with the enlarged key holes. The housing 164 limits the lateral movement in both directions as the adjustment block engages ends of the slot/recess of the housing 164. One of the limit positions can be set so that the limit defines the position at which the adjustment block opening 166 aligns with the enlarged key hole portion of the slot 126', to enable install and removal of the clamp bar from the clamp pins 142'.

It is to be clearly understood that the above description is intended by way of illustration and example only, is not intended to be taken by way of limitation, and that other changes and modifications are possible. For example, while horizontal mixer with a tapered canopy is primarily described, the seal assembly could be utilized in mixers in which the canopy has no taper.

What is claimed is:

1. A horizontal mixer comprising,
a mixer bowl mounted for rotation about a horizontal axis between an upright mix position and a turned load/unload position;
a canopy located to cover an open top of the bowl when the bowl is in the upright mix position; and
a scraper seal member at a top side portion of the bowl that engages with an underside of the canopy when the bowl is in the upright mix position, wherein the scraper seal member is part of a seal assembly that includes a mounting plate fixed to the bowl, a removable clamp plate at one side of the mounting plate and a removable clamp bar at an opposite side of the mounting plate, with a portion of the scraper seal member held between the clamp plate and the mounting plate.

2. The mixer of claim 1 wherein the clamp plate includes a plurality of clamp pins extending therefrom, the scraper seal member includes a plurality of first openings, the mounting plate includes a plurality of second openings and the clamp bar includes a plurality of third openings, where each clamp pin passes through a respective one of the first openings, a respective one of the second openings and a respective one of the third opening.

3. The mixer of claim 2 wherein each of the third openings is formed as a keyed slot having an enlarged key hole portion and an adjacent narrow portion, and each clamp pin includes a respective head portion that can pass through the enlarged key hole portion but not through the narrow portion.

4. The mixer of claim 3 wherein each narrow portion includes a cam surface, when the clamp bar slides laterally relative to the head portion to move the head portion into the narrow portion, the cam surface and head portion interact to pull the clamp plate toward the mounting plate to squeeze the portion of the scraper seal member.

5. The mixer of claim 3 wherein the clamp bar includes a positioning assembly thereon for laterally adjusting a position of the clamp bar along the mounting plate, the positioning assembly including an adjustment block slidable laterally along a portion of the clamp bar and engaged with one of the clamp pins.

6. The mixer of claim 5 wherein a housing is secured to the clamp bar, a rotatable rod is threadedly engaged with a portion of the housing such that rotation of the rod shifts a relative lateral position between the rod and both the housing and the clamp bar, the adjustment block is positioned within the housing, and the rod is operatively connected to the adjustment block such that rotation of the rod also shifts a relative lateral position between the adjustment block and the clamp bar.

7. The mixer of claim 6 wherein a non-threaded rotating joint interconnects the rod to the adjustment block.

8. The mixer of claim 1 wherein the clamp bar includes a first end portion and a second end portion, the first end portion is disposed on a first end post of the bowl and the second end portion is disposed on a second end post of the bowl, such that the clamp bar is pivotable about the first and second end posts.

9. A horizontal mixer comprising,
a mixer bowl mounted for rotation about a horizontal axis between an upright mix position and a turned load/unload position;
a seal member at a top side portion of the bowl, wherein the seal member is held in place by a seal assembly that includes a mounting plate fixed to the bowl, a clamp plate at one side of the mounting plate and a clamp bar at an opposite side of the mounting plate, with a portion of the scraper seal member held between the clamp plate and the mounting plate.

10. The mixer of claim 9 wherein the clamp plate includes a plurality of clamp pins extending therefrom, and openings in the scraper seal member, mounting plate and clamp bar are aligned such that each clamp pin passes through a set of aligned openings.

11. The mixer of claim 10 wherein each of the third openings is formed as a keyed slot having an enlarged key hole portion and an adjacent narrow portion, and each clamp pin includes a respective head portion that can pass through the enlarged key hole portion but not through the narrow portion.

12. The mixer of claim 11 wherein each narrow portion includes a cam surface, when the clamp bar slides laterally relative to the head portion to move the head portion into the narrow portion, the cam surface and head portion interact to pull the clamp plate toward the mounting plate to squeeze the portion of the scraper seal member.

13. The mixer of claim 11 wherein the clamp bar includes a positioning assembly thereon for laterally adjusting a position of the clamp bar along the mounting plate, the positioning assembly including an adjustment block slidable laterally along a portion of the clamp bar and engaged with one of the clamp pins.

14. The mixer of claim 13 wherein a housing is secured to the clamp bar, a rotatable rod is threadedly engaged with a portion of the housing such that rotation of the rod shifts a relative lateral position between the rod and both the housing and the clamp bar, the adjustment block is positioned within the housing, and the rod is operatively connected to the adjustment block such that rotation of the rod also shifts a relative lateral position between the adjustment block and the clamp bar.

15. The mixer of claim 14 wherein a non-threaded rotating joint interconnects the rod to the adjustment block.

16. A horizontal mixer comprising,
mixer bowl mounted for rotation about a horizontal axis between an upright mix position and a turned load/unload position;
a seal member at a top side portion of the bowl, wherein the seal member is held in place by a seal assembly that includes a plurality of clamp pins that interact with a laterally movable clamp bar to squeeze a portion of the seal member between first and second plate members.

17. The horizontal mixer of claim 16 wherein the first plate member is fixed on the bowl, the second plate member is positioned to one side of the first plate member and the clamp bar is positioned at an opposite side of the first plate member.

18. The horizontal mixer of claim 16 wherein each clamp pin is engaged with a respective slot on the clamp bar.

19. The horizontal mixer of claim 18 wherein, for one or more of the slots, shifting of the clamp bar to move a head portion of the clamp pin along the slot causes the head portion to interact with part of the slot such that the first plate member is pulled toward the second plate member.

20. The horizontal mixer of claim 16 wherein the clamp bar includes a positioning assembly mounted thereon for adjusting lateral position of the clamp bar, the positioning assembly including an adjustment block mounted for sliding movement along the clamp bar and linked to a rotatable adjustment rod, the adjustment block engaged with one of the clamp pins.

* * * * *